United States Patent

Parsons

[11] Patent Number: 5,826,372
[45] Date of Patent: Oct. 27, 1998

[54] LAWN EDGING

[76] Inventor: Peter D. Parsons, 1025 NE. 114th, Portland, Oreg. 97220

[21] Appl. No.: 705,796

[22] Filed: Aug. 30, 1996

[51] Int. Cl.$^6$ .................................................. A01G 1/00
[52] U.S. Cl. ........................................ 47/33; 404/7; 52/102
[58] Field of Search ................... 47/9, 32, 33; 52/102; 404/7, 8

[56] References Cited

U.S. PATENT DOCUMENTS

| | | |
|---|---|---|
| 643,677 | 2/1900 | Payne . |
| 1,916,494 | 7/1933 | Schrickel . |
| 2,713,751 | 7/1955 | Hendrixson .................... 47/33 |
| 3,041,781 | 9/1962 | Richten ......................... 47/33 |
| 3,277,606 | 10/1966 | Cohen ........................... 47/33 |
| 3,495,352 | 2/1970 | Sbare ............................ 47/33 |
| 3,545,127 | 12/1970 | Jensen .......................... 47/33 |
| 3,676,952 | 7/1972 | Watts ............................ 47/33 |
| 3,768,569 | 10/1973 | Nunnery ..................... 47/33 X |
| 3,865,309 | 2/1975 | Greenhalgh ................ 47/33 X |
| 4,321,769 | 3/1982 | Tisbo et al. ................... 47/33 |
| 4,663,883 | 5/1987 | Hilliard et al. ................ 47/33 |
| 5,291,708 | 3/1994 | Johnson ..................... 47/33 X |
| 5,377,447 | 1/1995 | Fritch ............................ 47/33 |
| 5,535,545 | 7/1996 | Matz ............................. 47/33 |
| 5,568,994 | 10/1996 | Dawson ..................... 47/33 X |

*Primary Examiner*—Michael J. Carone
*Assistant Examiner*—Robert Pezzuto
*Attorney, Agent, or Firm*—Chernoff, Vilhauer, McClung & Stenzel, LLP

[57] ABSTRACT

A lawn edging secured to the ground includes a trough having a pair of spaced apart first upright sides. A major portion of each of the first upright sides is in face-to-face abutment with at least one of the ground and a structure. The trough is secured to the ground, and interposed between an adjacent lawn and an adjacent structure. An insert has a pair of spaced apart second upright sides where at least one of the second upright sides has a height greater than the height of at least one of the first upright sides. The second upright sides are detachably insertable between the first upright sides of the trough such that at least one of the first upright sides extends above at least one of the second upright sides so that the insert can be detached from the trough to enable the lawn adjacent the trough to be mowed.

10 Claims, 5 Drawing Sheets

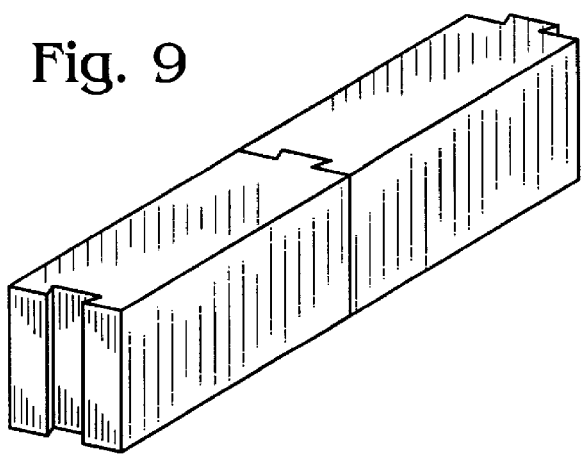
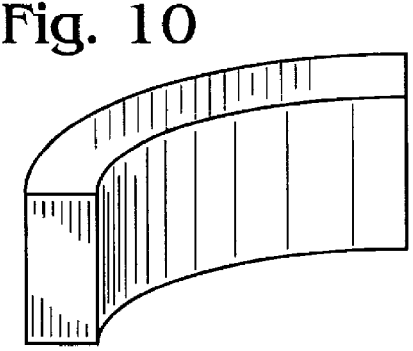
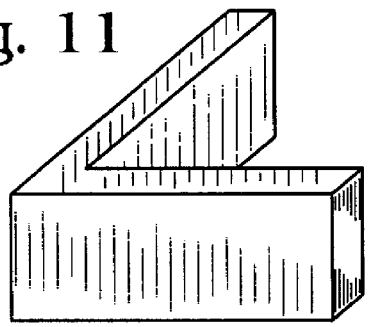
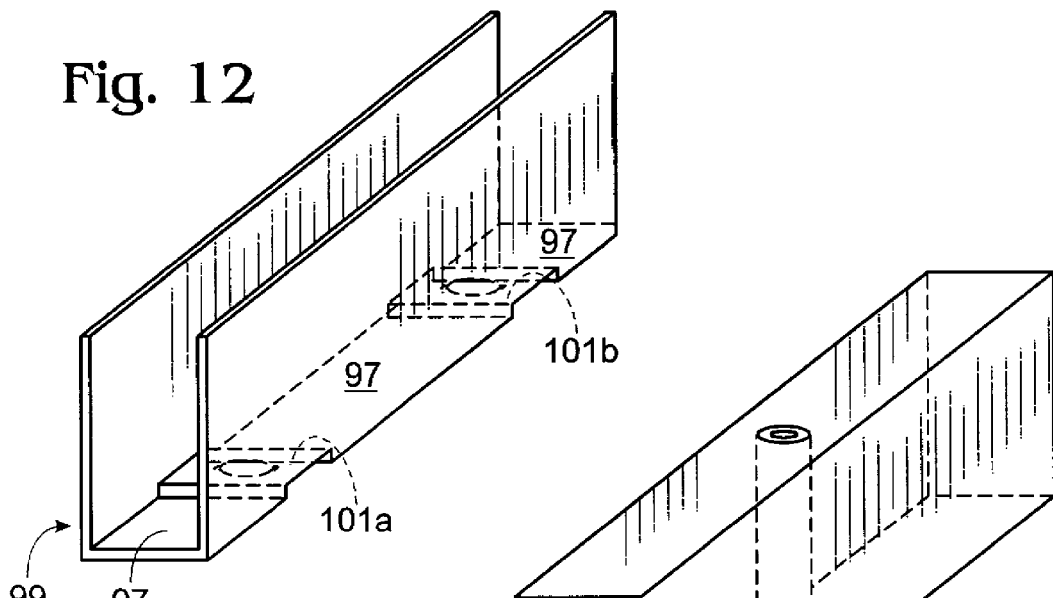
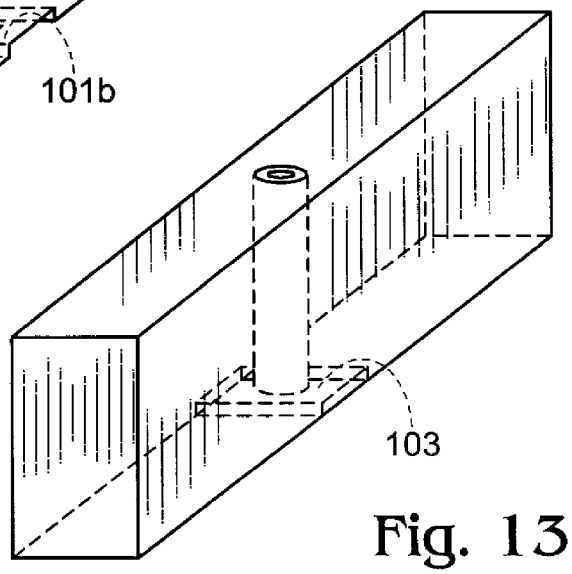

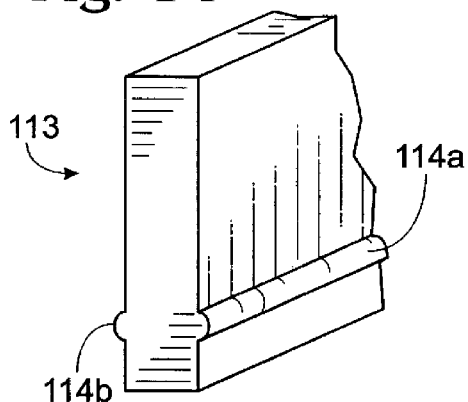
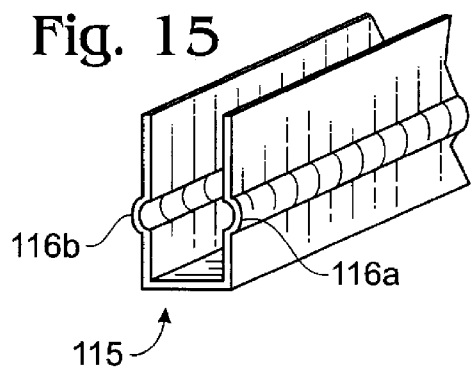
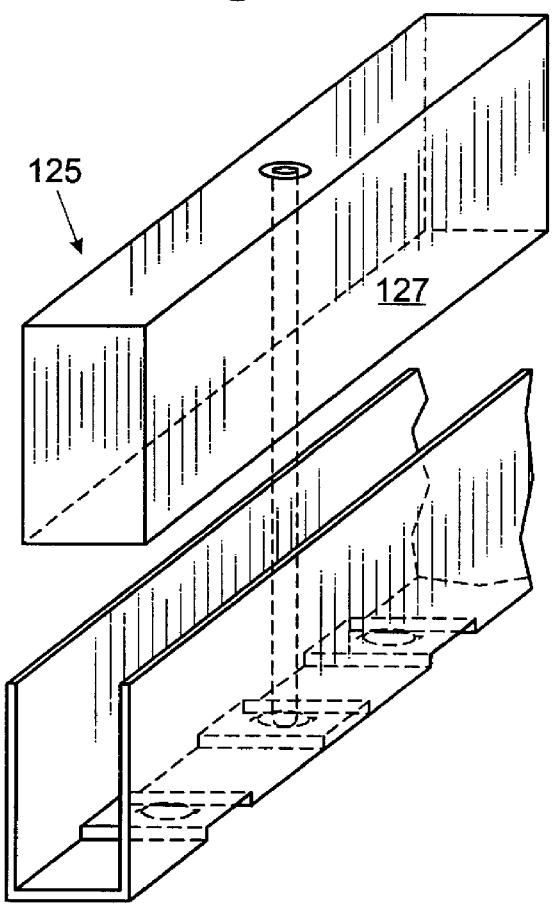
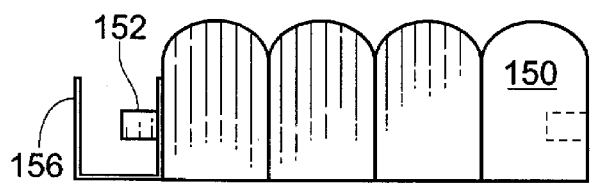
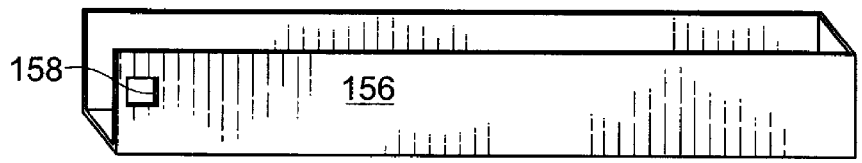
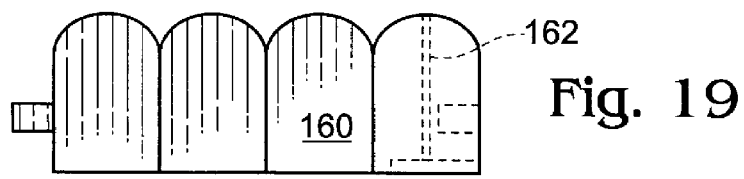

LAWN EDGING

BACKGROUND OF THE INVENTION

The present invention relates to lawn edging, and more particularly to lawn edging that aids trimming grass with a lawn mower around the edges of structures and the like.

A lawn mower is used to mow the grass including areas adjacent structures, such as, for example, walkways, rocks, buildings, flower beds, bark, and driveways. However, the blade of the lawn mower has a tendency to strike the structures causing damage to both the lawn mower and the structures. Accordingly, a trimmer is used around the edge of the lawn next to the structures to trim the perimeter region of the grass without damaging the structures. Using the trimmer to edge around the lawn is time-consuming and requires the purchase of an additional power tool.

Many lawn edging strips for inhibiting the growth of grass and/or weeds at locations adjoining a structure have been developed. In many applications, the edging strip is used along a structure which may have loose pebbles or hard dirt particles thereon, or the edging strip may adjoin an area which has decorative stones or hard objects. In either case, for safety reasons it is desirable that the lawn mower be moved in a controlled path along a guide strip to prevent the lawn mower blade from propelling the stones, pebbles, dirt, or other objects outwardly injuring bystanders or damaging nearby articles.

Hendrixson, U.S. Pat. No. 2,713,751, discloses an elongate strip with a laterally projecting flange located intermediate and projecting from the elongate strip to form a base, with a rigid hinged cover member mounted on the top edge of the elongate strip. A portion of the elongate strip is embedded in the ground and the laterally projecting flange rests upon the surface of the ground to inhibit the growth of grass underneath the strip. The elongate strip is located adjacent to a garden with the flange inhibiting the growth of grass adjacent to the garden. The hinged cover is normally in a closed position resting upon the lateral flange but may be swung out of the way to permit mowing the grass adjacent to the lateral flange with the lawn mower. The Hendrixson device requires the lawn to be recessed with respect to an adjoining garden and accordingly is unsuitable for a path or driveway having the same elevation as the adjoining lawn. Further, the hinged cover is prone to jamming if dirt gets in the hinge or the hinged cover is inadvertently bent by stepping on the device.

Fritch, U.S. Pat. No. 5,377,447, discloses an elongate landscape edging strip with a substantially flat planar lower surface and an upstanding, laterally reinforced retainer portion of channel-shaped cross section. The lower surface is secured in conformity to the ground contour along a landscaped border. The retainer portion abuts a fence or retains landscape fill. With the edging strip secured to the top of the ground, any unevenness of the ground that develops over time from the growth of grass, driving the wheel of the mower on the lower surface as designed, or walking thereon, will tend to cause the peripheral edges of the strip to separate from the ground. Furthermore, the flat portion of the lower surface upon which the tire of the lawn mower travels provides the appearance of a trim around the lawn which is not aesthetically pleasing to all homeowners.

Watts, U.S. Pat. No. 3,676,952, discloses a lawn edging device which both serves as a grass stop and a track for a lawn mower wheel. The device has a main strip and a sidewall extending upwardly from each side edge of the strip. The sidewalls each have a top ridge and an extension which extends downwardly from the respective ridge to define supporting legs for the device which are adapted to be embedded in the ground to hold the device in position. The main strip is sufficiently wide to define the track and the sidewalls serve as a guide for the wheel. The two supporting legs are merely stuck into the ground and are prone to becoming detached therefrom over time. In addition, the main strip is prone to deforming after repeated use or breaking if someone inadvertently steps on the lawn device.

Sbare, U.S. Pat. No. 3,495,352, discloses a lawn edging device that has a main body plate embedded in the ground between the edge of a lawn and the area from which the grass is to be excluded. An auxiliary plate is arranged for attachment to the main plate and extends horizontally into the lawn to prevent grass growth adjacent to the main body plate while permitting lawn mower operation on the auxiliary plate. However, excessive use or inadvertently stepping on the flat auxiliary plate adjacent to the ground may break it. The auxiliary plate is also susceptible to accumulating grass and other materials thereon while mowing so cleaning is required after mowing the lawn.

What is desired, therefore, is a lawn edging that is neat, inexpensive to manufacture, easy to use, does not become detached from the surface of the lawn, not highly susceptible to being inadvertently stepped on, resistant to accumulating grass and other materials thereon, and provides an aesthetically pleasing appearance.

SUMMARY OF THE INVENTION

The present invention overcomes the aforementioned drawbacks of the prior art by providing a lawn edging secured to the ground that includes a trough having a pair of spaced apart first upright sides. A major portion of each of the first upright sides is in face-to-face abutment with at least one of the ground and a structure. The trough is secured to the ground, and interposed between an adjacent lawn and an adjacent structure. An insert has a pair of spaced apart second upright sides where at least one of the second upright sides has a height greater than the height of at least one of the first upright sides. The second upright sides are detachably insertable between the first upright sides of the trough such that at least one of the first upright sides extends above at least one of the second upright sides so that the insert can be detached from the trough to enable the lawn adjacent the trough to be mowed.

With the trough secured in the ground it is not susceptible to becoming detached from the ground after repeated use or abuse. The insert is simply detachably insertable to the trough which provides ease of mowing and an aesthetically pleasing appearance. The insert also extends up into space beyond the trough so it is not susceptible to accumulating grass and other materials thereon. In addition, the trough is highly visible so it is unlikely to be inadvertently stepped on.

An object of the present invention is a lawn edging adapted to form an edge for structures which is neat in appearance, inexpensive to manufacture, and which can be easily installed.

Another object of the present invention is a lawn edging for structures which is particularly useful in keeping a lawn around the structure trim right up to the edge of the structure.

A further object of the present invention is a lawn edging for structures enabling surrounding grass to be cut neatly around the edges of the structure by a lawn mower, without the necessity of using a trimmer.

A further object of the present invention is a lawn edging for structures enabling neat and trim cutting of grass immediately surrounding the structure by a lawn mower without injury to plants located adjacent to or overhanging the edges of the structure.

A further object of the present invention is a lawn edging adapted to be swung to an upright position to allow the grass to be mowed easily.

A further object of the present invention is a lawn edging that does not have an aesthetically unpleasing flat flange.

A further object of the present invention is a lawn edging that has the appearance of a brick edging for a sidewalk or driveway.

A further object of the present invention is a lawn edging that is not susceptible to accumulating grass and other materials thereon.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 9 is a perspective view detailing a dove tail interlocking joint for a pair of adjacent inserts.

FIG. 10 is a perspective view of an insert with a quarter circle.

FIG. 11 is a perspective view of an insert with a right angle shape.

FIG. 12 is a perspective view of an alternative trough.

FIG. 13 is a perspective view of an alternative insert suitable for insertion to the trough of FIG. 12.

FIG. 14 is a perspective view of a further alternative insert.

FIG. 15 is a perspective view of a further alternative trough suitable for the insert of FIG. 14 to be inserted into.

FIG. 16 is a perspective view of an alternative trough and insert.

FIG. 17 is a side view of a further alternative insert and trough.

FIG. 18 is a perspective view of the trough of FIG. 17.

FIG. 19 is a perspective view of an alternative insert suitable for the trough of FIG. 18 that includes a locking system.

DETAILED DESCRIPTION OF THE PREFERRED EMBODIMENT

Figure 1:
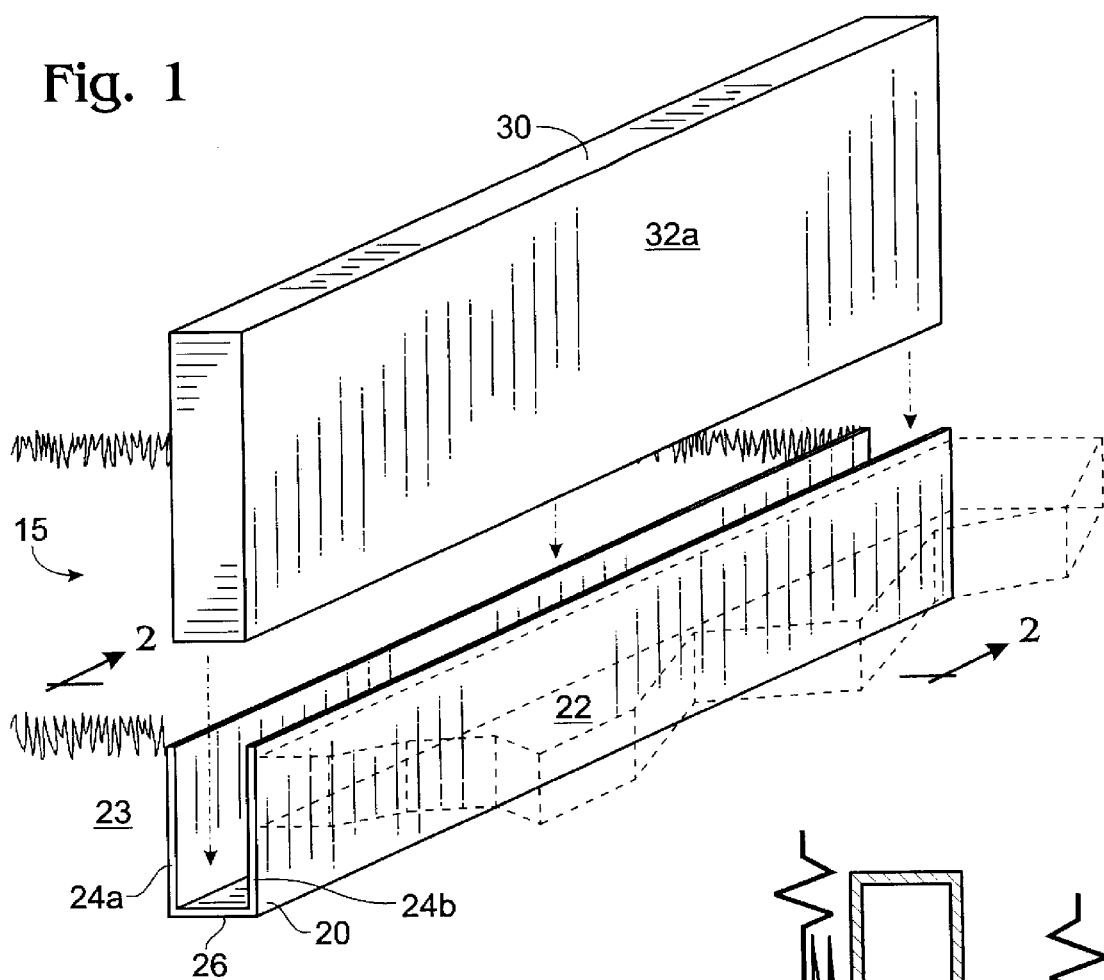
FIG. 1 is a perspective view of an exemplary embodiment of a lawn edging having a trough interposed in the ground between a structure and a lawn, together with a detachably insertable insert.

Referring to FIG. 1, a lawn edging 15 includes a trough 20 secured in a trench within the ground. The trough 20 is preferably rigid with two parallel spaced apart upright sides 24a and 24b connected together by a flat bottom 26 (2½ inches wide and 3 inches deep). The shape and size of the trough 20 may be changed as desired such as, for example, "VI" shaped. The trough 20 is preferably constructed of a grass impermeable, water resistant, opaque plastic such as PVC or ABS. However, any suitable material may be used. With the trough 20 installed and secured within the ground it does not need to be flexible to conform to the surface of the ground. Accordingly, if the surface of the ground changes shape the trough 20 will not be affected.

Figure 2:
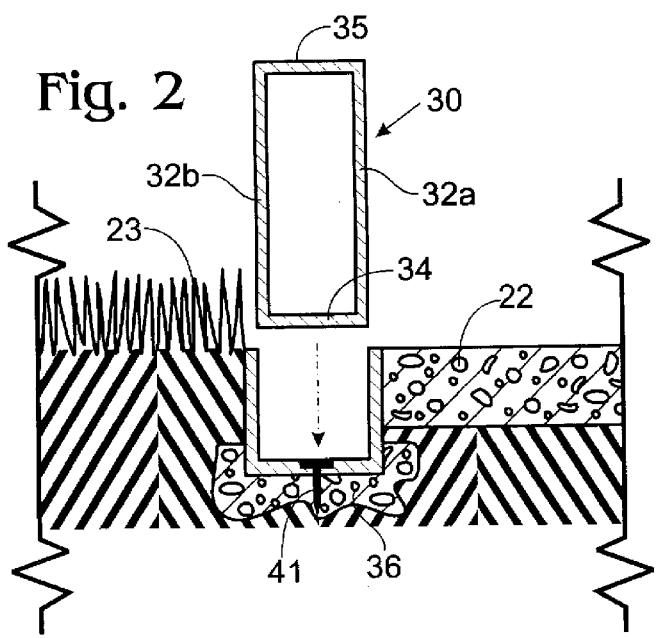
FIG. 2 is a sectional view, taken along line 2—2 of FIG. 1, of the insert inserted in the trough secured by a concrete anchor.

A rigid rectangular hollow insert 30 with opposing spaced apart parallel sides 32a and 32b, a flat bottom 34, and a flat top 35 (2½ inches wide and 7 inches deep) is sized to tightly and snugly engage the inner surfaces of the upright sides 24a and 24b of the trough 20. The insert 30 is preferably constructed of a grass impermeable, water resistant, opaque plastic such as PVC or ABS. However, any suitable material may be used. The insert 30 is inserted in the trough 20, as shown in FIG. 2. The height of the opposing sides 32a and 32b of the insert 30 are preferably significantly greater than the height of the sides 24a and 24b of the trough 20 so that a significant portion of the insert 30 extends above the surface of the ground. With the insert 30 engageable by simply a friction fit within the trough 20, it is easily attached and detached, as desired. In addition, the simple geometric shapes of the trough 20 and insert 30 are inexpensive to manufacture. The length of the trough 20 and insert 30 preferably come in predetermined lengths, but may be shortened by cutting, as desired. Preferably, a long trough 20 is used with several block inserts 30 of 1-, 2-, or 3-foot lengths so that when damaged, only one relatively short insert needs to be replaced.

The insert 30 and trough 20 function to separate the path or other structure 22 from the grass 23. With the insert 30 extending above the trough 20, which is preferably flush with the ground or adjacent structure 22, the grass 23 is prevented from growing close to the structure 22 thus preventing loose materials, pebbles, etc. from moving from the structure 22 to the grass 23. Prior to mowing the lawn 23, the insert 30 is simply removed from the trough 20 and placed aside. The lawn 23 is mowed with one wheel of the lawn mower preferably traveling on the structure or one of the upright edges of the trough 20. The wheel may alternatively hang over the center of the trough 20, or if the trough 20 is narrower than the width of the wheel then the wheel may travel on both upright sides 24a and 24b. Accordingly, the lawn 23 may be mowed and trimmed close to the structure 22 without significant potential of striking the structure 22 and causing damage. The sides 24a and 24b may extend above the adjoining ground, lawn, and structure 22, if desired.

After the lawn is mowed, the insert 30 is simply reinserted within the trough 20. With the insert 30 detachably insertable in the trough 20, there is no need to edge the lawn 23 with a trimmer. The lawn edging decreases the time required to mow and trim the lawn 23.

The configuration of the trough 20 and insert 30 is unlikely to be damaged by inadvertently being stepped on because it does not include a flange that extends over a portion of the ground. The upright nature of the insert 30 is easily noticed and avoided by inattentive persons walking nearby. In addition, the lawn edging is not likely to require cleaning because there are no substantial flat surfaces adjacent the lawn 23 or structure 22 that are prone to accumulating grass and other materials.

Figure 2A:
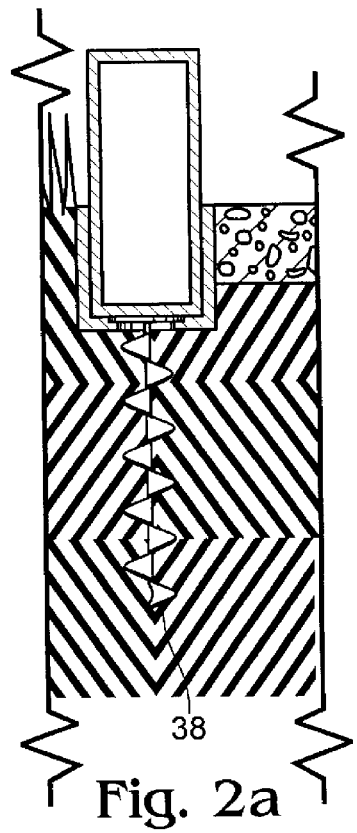
FIG. 2a is a sectional view, taken along line 2—2 of FIG. 1, showing an alternative auger-type anchor.

Referring to FIG. 2, the trough 20 is preferably secured in the ground by cement 36 and a bolt or split pin 41 at one or more locations along the bottom surface 26 of the trough 20. Referring to FIG. 2A, the trough 20 may alternatively be held in place by a screw 38.

Figure 3A:
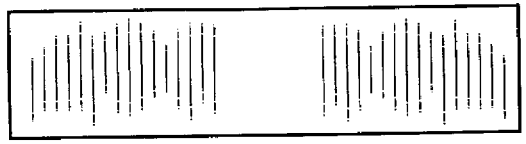
FIG. 3a is a side view of the insert shown in FIG. 1.
Figure 3B:
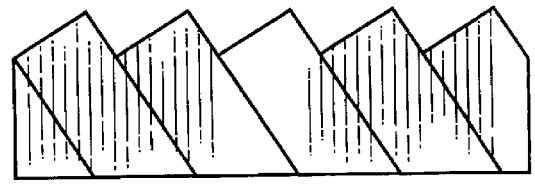
FIG. 3b is a side view of an alternative insert.
Figure 3C:
FIG. 3c is a side view of another alternative insert.
Figure 3D:
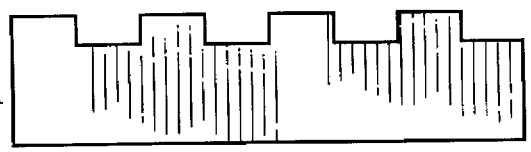
FIG. 3d is a side view of a further alternative insert.
Figure 3E:
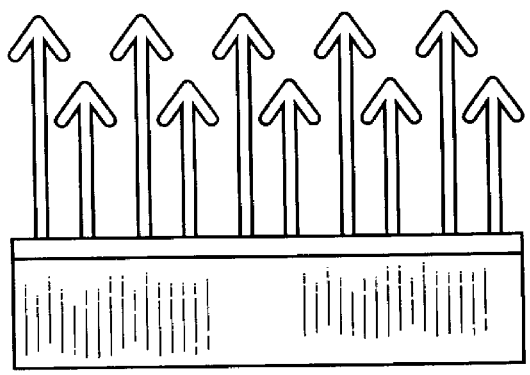
FIG. 3e is a side view of still a further alternative insert with a fence affixed thereto.

Frequently, the edge of a path or other structures may include decorative upright blocks to provide an aesthetic appearance to the yard. The insert 30 has a rectangular appearance. Alternatively, the insert 30 may have any suitable shape that the homeowner may desire, such as those shown in FIGS. 3a, 3b, 3c and 3d. FIG. 3e shows an insert that also functions as a fence (18 inches high) designed to allow the wind to pass through. The modularity of the lawn edging device permits different appearances to be provided to the edging of the lawn by simply replacing the insert with an alternative insert having the desired appearance. Also, the lawn edging can provide the appearance of traditional brick or block edging for a walkway or other structure, so the lawn edging of the present invention has an aesthetically pleasing appearance.

Figure 4:
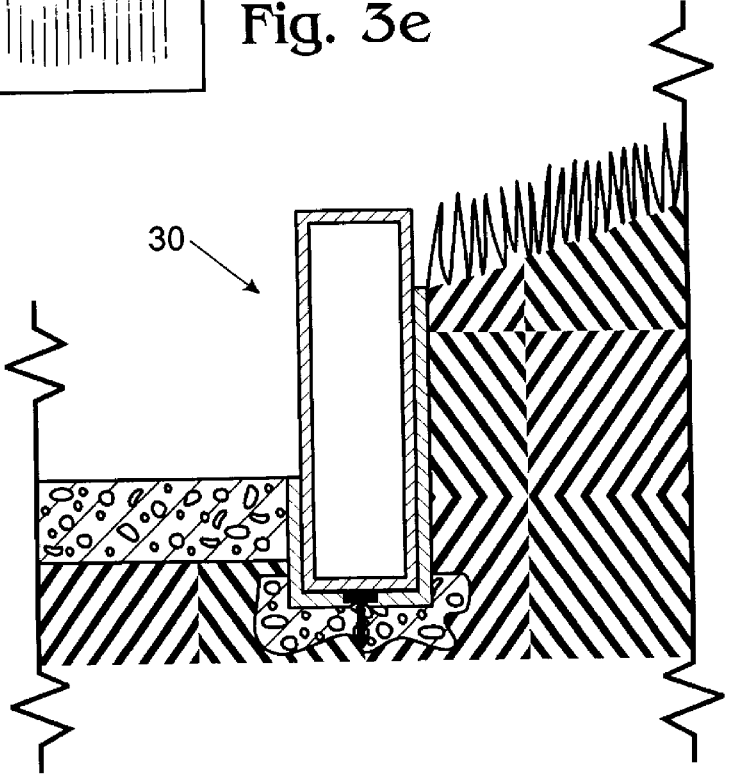
FIG. 4 is a cross section of a trough and insert where the structure and lawn are at different elevations.

Referring to FIG. 4, when there are hillsides or other uneven portions between the edge of the lawn and structures, such as, for example, paths, the upright edges 24a and 24b of the trough 20 preferably have an uneven length to match the different heights of the adjoining lawn and structure. The insert 30 preferably has a height greater than the height of the greater upright side of the trough, so as to prevent materials from falling onto the structure. However, the insert 30 may have a height between the different heights of the upright sides of the trough, if desired.

Figure 5:
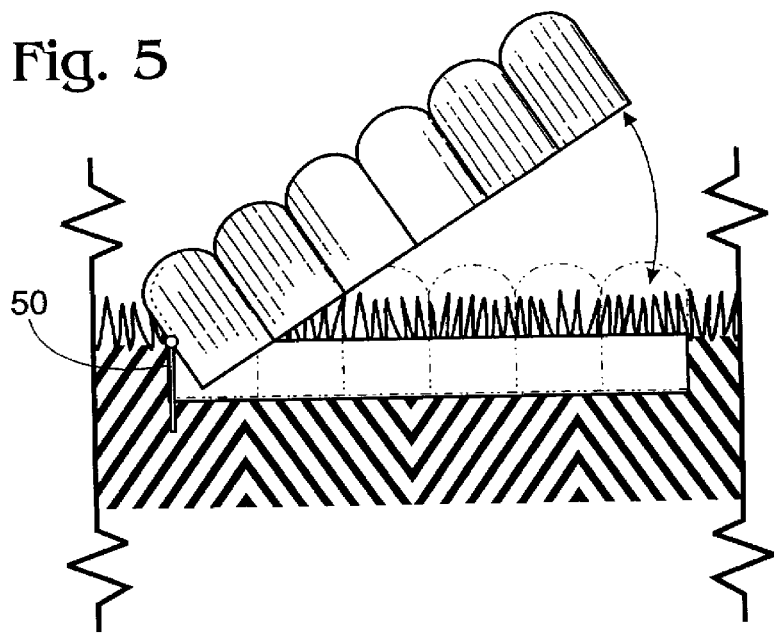
FIG. 5 is a side view of the insert and trough of FIG. 1 attached together by a hinge.

Referring to FIG. 5, the end of an insert 30 may include a hinge 50 around which the insert 30 is raised and lowered. This permits the insert 30 to be readily inserted and removed in a controlled fashion to the trough 20. In addition, this inhibits the insert 30 from being removed by children. Also, a pair of inserts 30 can be arranged with hinges 50 located at opposing ends, if desired.

Figure 6:
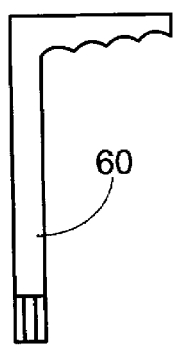
FIG. 6 is a sectional view of a locking system for the trough and insert.
Figure 7:
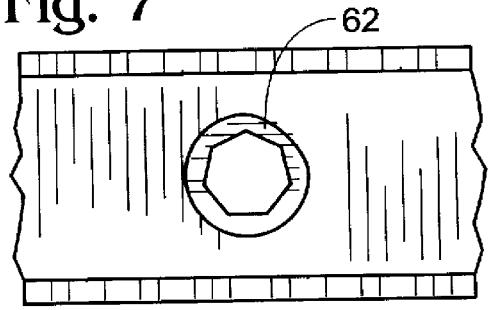
FIG. 7 is a top plan view of the locking system of FIG. 6.
Figure 8:
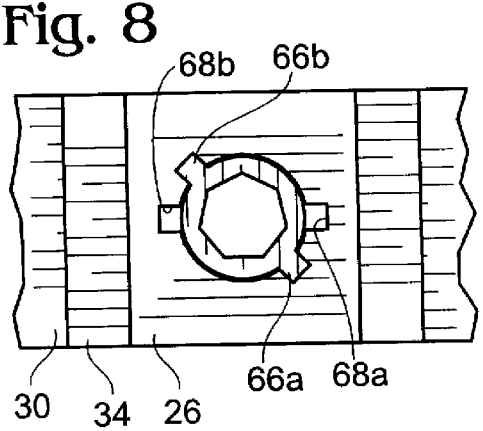
FIG. 8 is a bottom plan view of the locking system of FIG. 6.
Figure 8:
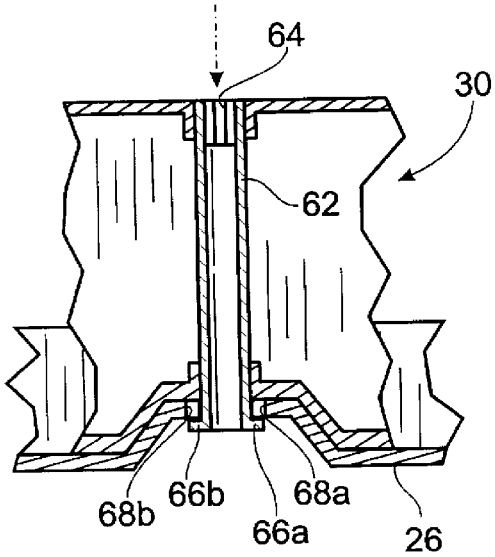

Referring to FIG. 6, a key system may be used to lock the trough 20 to the insert 30 in order to prevent the insert 30 from becoming inadvertently detached and potentially stolen. A key 60 engages a matching shaped recess 64 attached to the upper end of a rotatable shaft 62. The lower portion of the insert 30 and the trough 20 each include a raised portion to receive the shaft 62 therethrough. Referring to FIG. 7, the shaft 62 is preferably hollow with a circular outer contour. Referring also to FIG. 8, a pair of tabs 66a and 66b are connected to the end of the shaft 62 and aligned with a pair of slots 68a and 68b in the bottom surface 26 of the trough 20. With the tabs 66a and 66b aligned with the slots 68a and 68b, the tabs 66a and 66b may be inserted through the slots 68a and 68b. Then the shaft 62 is turned to lock the insert 30 to the trough 20. The insert 30 is unlocked in the reverse fashion.

Referring to FIG. 9, the ends of an insert may include interlocking portions to hold adjacent inserts together and prevent gaps between adjacent inserts. Referring to FIG. 10, the insert and accompanying trough (not shown) may have a curved shape to accommodate curved features. For example, a set of semi-circular portions may be used to form a decorate lawn edging for shrubs. Referring to FIG. 11, insert and trough (not shown) may also be shaped with a right angle to provide corners.

Referring to FIG. 12, a modified trough 99 can include a plurality of separate raised portions 101a and 101b on its bottom surface 97, each suitable to receive the end of the shaft 62. Referring to FIG. 13, an insert 105 with one or more raised lower sections 107 is insertable within the trough 99 with the raised portions 101a or 101b mating with the raised portion 103. The shaft 62 is inserted through the insert 105 and trough 99 to lock each insert 105 to the trough 99. This arrangement is suitable for high traffic areas where it is important to keep the inserts from being removed.

Referring to FIG. 16, an alternative to FIGS. 12 and 13 includes an insert 125 with a flat bottom 127.

Referring to FIG. 14, an alternative insert 113 includes a pair of rounded protrusions. 114a and 114b on opposing sides of the insert 113. Referring to FIG. 15, an alternative trough 115 includes a pair of curved recessed portions 116a and 116b located to receive the curved protrusions 114a and 114b when the insert 113 is inserted within the trough 115. This provides a "snap-fit" arrangement for retaining the insert 113 within the trough 115.

Referring to FIG. 17, an alternative insert 150 includes a centrally located square projection 152 on one end and a centrally located matching square recess 154 on the other end. A plurality of inserts 150 are aligned in a trough with the projection 152 of one insert engaged with the recess 154 of the next adjacent insert 150. Referring to FIG. 18, a trough 156 may include an opening 158. The trough 156 is placed at a right angle to the end of one trough such that the projection 152 can be inserted within the opening 158. The remaining inserts 150 can then be located in the trough 156 at a right angle to the other inserts. Referring to FIG. 19, an insert 160 can include a locking system 162 at one end.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A lawn edging secured to the ground comprising:
   (a) a trough having a pair of spaced apart first upright sides;
   (b) a tie-down device attached to and extending downwardly from said trough and securing said through to the ground;
   (c) a major portion of each of said first upright sides in face-to-face abutment with at least one of said ground and a structure;
   (d) said trough being secured to said ground, and interposed between an adjacent lawn and an adjacent said structure;
   (e) an insert having a pair of spaced apart second upright sides, at least one of said second upright sides having a height greater than the height of at least one of said first upright sides;
   (f) said second upright sides being detachably insertable between said first upright sides of said trough such that at least one of said second upright sides extends above at least one of said first upright sides so that said insert can be detached from said trough to enable said lawn adjacent said trough to be moved;

(g) said second upright sides are detachably engagable between said first upright sides; and (h) both respective pairs of adjacent said first and second upright sides define major surfaces, said respective pairs of said major surfaces are in face-to-face frictional engagement when said insert is engaged within said trough.

2. The lawn edging of claim 1 wherein said trough has a substantially flat bottom surface to which said spaced apart first upright sides are attached.

3. The lawn edging of claim 2 wherein said first upright sides are parallel to each other.

4. The lawn edging of claim 1 where one of said first upright sides is in face-to-face abutment with said ground and the other of said first upright sides is in face-to-face abutment with said structure.

5. The lawn edging of claim 1 wherein said structure is one of a walkway, a bed of rocks, a building, a flower bed, and a driveway.

6. The lawn edging of claim 1 wherein both of said spaced apart second upright sides have a height greater than said height of both of said first upright sides.

7. The lawn edging of claim 1 wherein each of said first upright sides has a different height from one another.

8. The lawn edging of claim 1 further comprising a hinge interconnecting said trough and said insert so that said insert detach ably insertable with said trough about said hinge.

9. The lawn edging of claim 1 further comprising a locking mechanism interconnecting said trough to said insert so as to prevent relative motion between said insert and said trough.

10. A lawn edging secured to the group comprising:

(a) a trough having a pair off spaced apart first upright sides;

(b) a major portion of each of said first upright sides in face-to-face abutment with at least one of said ground and a structure;

(c) said trough being secured to said ground, and interposed between an adjacent lawn and an adjacent said structure;

(d) an insert having a pair of spaced apart second upright sides, at least one of said second upright sides having a height greater than the height of at least one of said first upright sides;

(e) said second upright sides being detachably insertable between said first upright sides of said trough such that at least one of said second upright sides extends above at least one of said first upright sides so that said insert can be detached from said trough to enable said lawn adjacent said trough to be moved;

(f) said second upright sides are detachably engagable between said first upright sides;

(g) both respective pairs of adjacent said first and second upright sides define major surfaces, said respective pairs of said major surfaces are in face-to-face frictional engagement when said insert is engaged within said trough; and (h) a hinge connecting said insert to said trough and permitting said insert to be readily inserted and removed from said trough in a controlled manner.

* * * * *